W. GRAFE.
REVOLVING HARROW.
APPLICATION FILED OCT. 24, 1908.
919,570.
Patented Apr. 27, 1909.
2 SHEETS—SHEET 1.
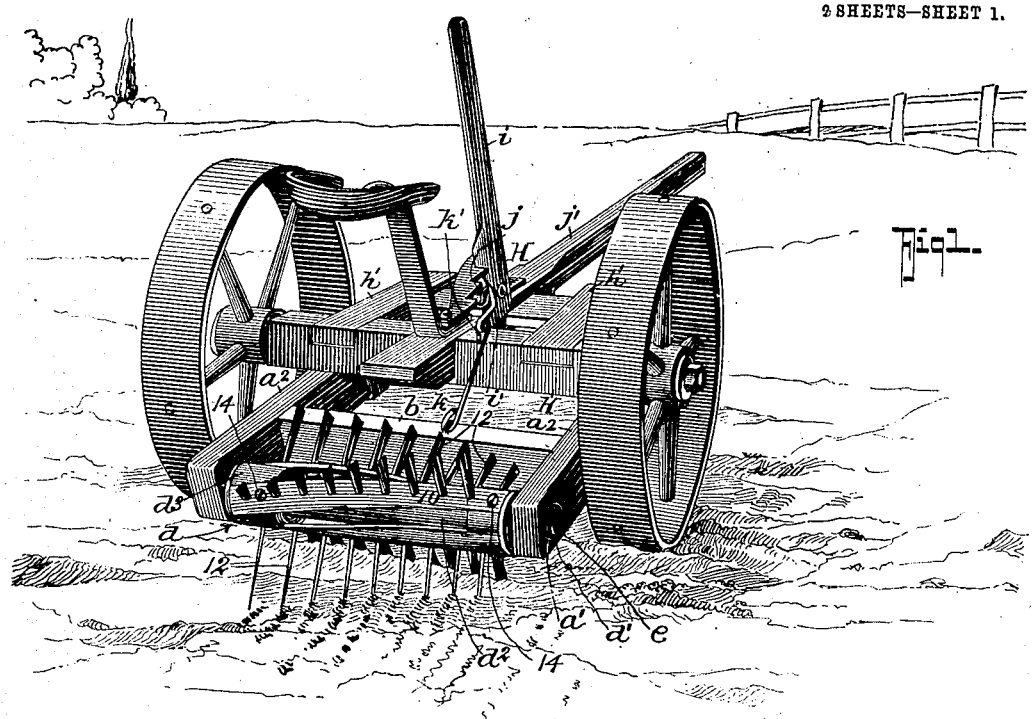
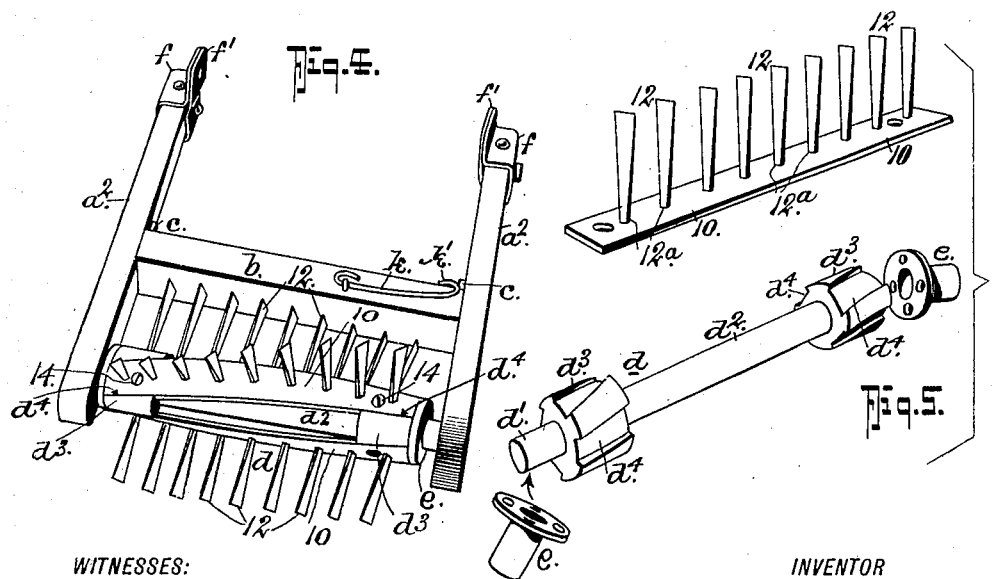
WITNESSES:
J. Theodore Schrott
Charles H. Wagner.
INVENTOR
William Grafe.
BY
Fred G. Dieterich
ATTORNEYS.

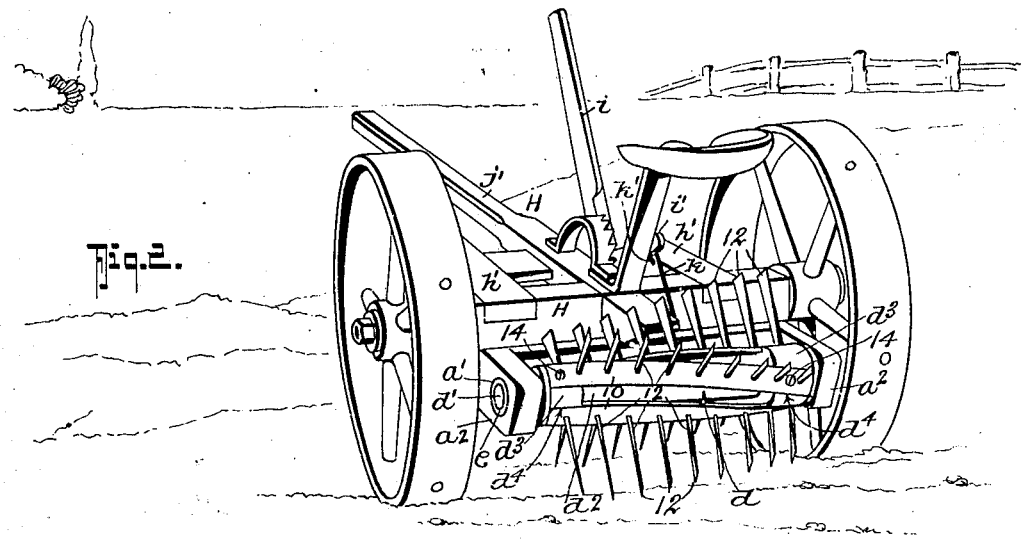
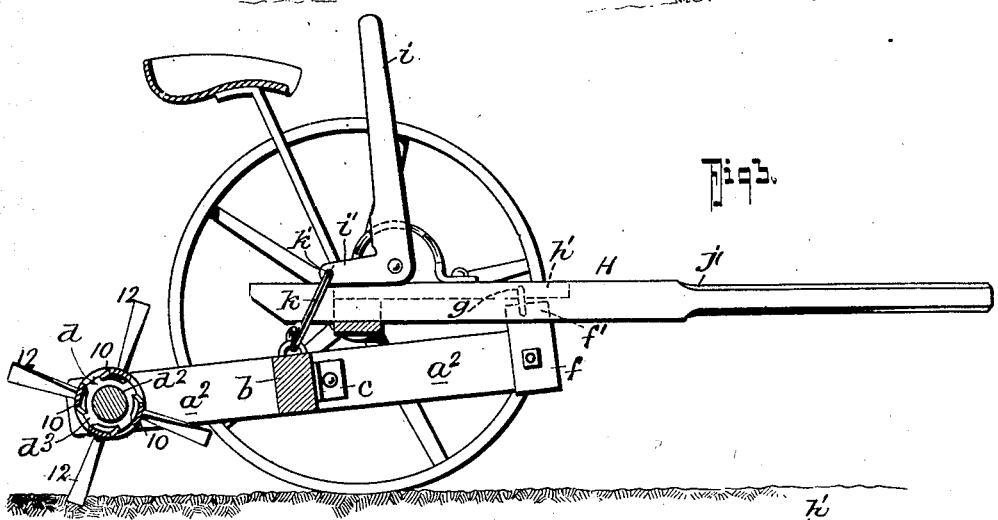
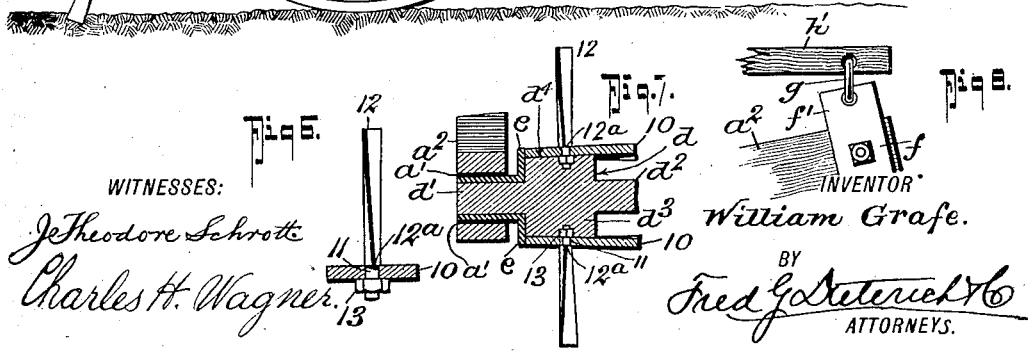

UNITED STATES PATENT OFFICE.

WILLIAM GRAFE, OF VIOLA, IDAHO.

REVOLVING HARROW.

No. 919,570.  Specification of Letters Patent.  Patented April 27, 1909.

Application filed October 24, 1908. Serial No. 459,405.

*To all whom it may concern:*

Be it known that I, WILLIAM GRAFE, residing at Viola, in the county of Latah and State of Idaho, have invented a new and Improved Revolving Harrow, of which the following is a specification.

My invention has for its object to provide a simple and inexpensive revolving harrow, more especially adapted for being used as a riding harrow or weeder, and for being readily attached to seeders and planters, and it comprehends an improved arrangement of drag frame having means for detachably connecting with a seeder or planter frame or the common type of sulky cart and a harrow comprising a revolving head mounted on the drag frame, and certain details of construction of the harrow head, all of which will be hereinafter fully described, specifically pointed out in the appended claims and illustrated in the accompanying drawings, in which:

Figure 1, is a perspective view that illustrates my improved harrow as combined with an ordinary type of sulky or cart, the harrow being at its lowermost or operative position. Fig. 2, is a similar view showing the harrow elevated for being carted over the field. Fig. 3, is a vertical, longitudinal section thereof. Fig. 4, is a perspective view of the harrow head and the drag frame in which the head is mounted, and Fig. 5, is a detail view that illustrates the revolving head and the teeth carrying plates separated. Figs. 6, 7 and 8 are enlarged detail views of portions of my device which will hereinafter be referred to.

In the practical arrangement, my invention consists of a simple form of drag frame comprising side bars $a^2$—$a^2$ and a cross or brace bar $b$ that joins at the ends with the side bars nearly midway thereof and to which it is secured in any approved manner, preferably by angle plates $c$—$c$ that join with the cross and side bars as clearly shown in the drawings.

The ends of the side bars $a^2$—$a^2$ have transverse apertures $a'$—$a'$ that form the bearings for the short end journals $d'$—$d'$ on the harrow head $d$ and when desired the said bearings may have supplemental wear sleeves $e$—$e$ that are fitted in the apertures $a'$—$a'$, their ends being bent up to form collars for holding them firmly within the apertures.

At the forward end each side bar $a^2$ has a ferrule like member $f$ formed of a single piece of strap metal bent over the said bar ends and secured thereto by a bolt and nut.

The ends of the strap metal are bent up vertically from the bars $a^2$ to form ears $f'$—$f'$ and these are apertured to receive the hanger bails $g$—$g$ that hingedly support the drag frame from the forwardly extended side beams $h'$ of the sulky frame H when my improvement is used in the manner best shown in Figs. 1, 2 and 3, it being understood that when my invention is to be used on a seeder or planter frame the said hanger ears $f'$—$f'$ can be attached to the planter frame in any approved manner.

The sulky frame shown in Figs. 1, 2 and 3 includes a lever $i$ that is fulcrumed at the lower end to a stud piece $j$ on the tongue $j'$ and it has a right angle portion $i'$ for receiving the hooked end $k'$ of a lifting rod $k$ that is hingedly joined to the cross bar $b$.

By reason of providing the lever the operator who rides the sulky can conveniently raise the revolving harrow head off the ground when turning around or carting the same across the field.

The revolving harrow head, the construction of which forms the essential feature of my invention, and which is best shown in Figs. 1 and 3 consists of a solid hub or shaft $d$ the ends of which are reduced to form the journals and midway the ends of the said head is of a reduced diameter as at $d^2$, whereby to form end bearings $d^3$ of a larger diameter than the body portion, proper, of the head for the reason presently understood.

10 designates a series of spring metal plates of a length equal that of the head proper, and these plates in practice are slightly bowed in the direction of their length, whereby to add increased resiliency thereto when secured to the head $d$ as shown.

Each of the plates 10 has a series of spring metal harrow teeth 12, each having a reduced threaded heel $12^a$ for passing through the apertures 11 in the plates 10 and to receive the clamp nuts 13 as clearly shown in Figs. 6 and 7.

To render the attachment of the plates 10 to the head $d$ the more rigid and durable the end bearings $d^3$ of the head have longitudinally extended peripheral sockets $d^4$ to receive the ends of the plates 10 which are secured by the bolt screw and nut members 14.

The plates 10 are disposed obliquely with respect to the longitudinal axis of the head to cause each row of teeth in coming in contact with the ground to engage consecutively instead of all at one time, thereby rendering the revolving of the head the more positive and at the same time reduce danger of breaking the teeth in engaging solid stubble, rocks, etc.

By bowing the plates 10 and reducing the diameter of the head $d$ between the ends that receive the ends of the said plates ample provision is made for permitting a free springy action of the plates 10 with their teeth to reduce shock of teeth engaging solids, and at the same time give the teeth and the plates ample room to spring backward or inwardly in passing over obstructions.

I am aware that rotary harrow heads have been heretofore provided and adapted for being attached to a drag or a wheeled frame. My invention, so far as I know, differentiates from what has been provided in the manner in which the head is constructed since provision is made for giving the teeth the desired resiliency to escape easy breaking when passing over obstructions and yet at the same time give the teeth the desired rigidity for the work intended.

Having thus described my invention, what I claim is:

1. The combination of a wheel supported main frame, a supplemental frame that includes side bars having means at the front ends for hingedly and pendently connecting with the main frame. means on the main frame connected with the supplemental frame for lifting the supplemental frame, a rotary head mounted in the rear ends of the said side bars, the said head having end bearings of a greater diameter than the body portion proper, formed with longitudinal sockets and spring metal tooth carrying plates mounted lengthwise on the head with their ends in the sockets of the end bearings thereof, means for fixedly securing the said ends on the head, the said plates being bowed outwardly substantially as shown and for the purposes described.

2. A harrow attachment of the character described comprising a frame including side bars, a rotary head mounted in the rear ends of the side bars, said head comprising a central portion of one diameter and end portions of a larger diameter, the said end portions having longitudinal sockets and bowed spring metal plates that extend lengthwise of the head whose ends fit the sockets in the bearing portions and are secured thereto, said plates carrying tooth members.

3. A harrow attachment of the character described comprising a frame including side bars, a rotary head mounted in the rear ends of the side bars, said head comprising a central portion of one diameter and end portions of a larger diameter, the said end portions having longitudinal sockets and bowed spring metal plates that extend lengthwise of the head in oblique direction, whose ends fit the sockets in the bearing portions and are secured thereto, and tooth members detachably secured to the said plates, substantially as shown and for the purposes described.

WILLIAM GRAFE.

Witnesses:
H. MELGARD,
A. P. DAHL.